US012735553B2

(12) United States Patent
Yin et al.

(10) Patent No.: US 12,735,553 B2
(45) Date of Patent: Sep. 15, 2026

(54) MAGNETIC DIELECTRIC RESIN COMPOSITION, AND PREPREG AND COPPER CLAD LAMINATE COMPRISING SAME

(71) Applicant: SHENGYI TECHNOLOGY CO., LTD., Guangdong (CN)

(72) Inventors: Weifeng Yin, Guangdong (CN); Qianfa Liu, Guangdong (CN); Jianying Shi, Guangdong (CN); Jiangling Zhang, Guangdong (CN); Sha Li, Guangdong (CN); Songgang Chai, Guangdong (CN); Yongjing Xu, Guangdong (CN); Cui Huo, Guangdong (CN)

(73) Assignee: SHENGYI TECHNOLOGY CO., LTD., Guangdong (CN)

( * ) Notice: Subject to any disclaimer, the term of this patent is extended or adjusted under 35 U.S.C. 154(b) by 639 days.

(21) Appl. No.: 18/033,829

(22) PCT Filed: Nov. 10, 2020

(86) PCT No.: PCT/CN2020/127788

§ 371 (c)(1),
(2) Date: Apr. 26, 2023

(87) PCT Pub. No.: WO2022/088247

PCT Pub. Date: May 5, 2022

(65) Prior Publication Data

US 2024/0010810 A1 Jan. 11, 2024

(30) Foreign Application Priority Data

Oct. 27, 2020 (CN) ........................ 202011165215.0

(51) Int. Cl.

| | |
|---|---|
| ***C08K 3/22*** | (2006.01) |
| ***B32B 15/08*** | (2006.01) |
| ***C08J 5/18*** | (2006.01) |
| ***C08K 5/00*** | (2006.01) |
| ***C08L 101/12*** | (2006.01) |

(52) U.S. Cl.

CPC ................ *C08K 3/22* (2013.01); *B32B 15/08* (2013.01); *C08J 5/18* (2013.01); *C08K 5/0066* (2013.01); *C08L 101/12* (2013.01); *C08K 2003/2265* (2013.01)

(58) Field of Classification Search

CPC ......... B32B 15/08; B32B 15/14; B32B 15/20; B32B 2262/101; B32B 2264/102; B32B 2264/1021; B32B 2264/1022; B32B 2307/3065; B32B 25/16; B32B 27/18; B32B 27/281; B32B 27/30; B32B 27/322; B32B 27/38; C08J 2363/00; C08J 2371/12; C08J 2463/00; C08J 5/18; C08J 5/244; C08K 13/04; C08K 2003/2265; C08K 3/22; C08K 5/0066; C08K 7/14; C08L 101/12; C08L 63/00; C08L 71/12; H05K 1/03

See application file for complete search history.

(56) References Cited

U.S. PATENT DOCUMENTS

2017/0327683 A1 11/2017 Hu et al.

FOREIGN PATENT DOCUMENTS

| | | | | |
|---|---|---|---|---|
| CN | 104910823 A | | 11/2015 | |
| CN | 106205942 A | | 12/2016 | |
| CN | 106928660 A | | 7/2017 | |
| CN | 109553955 A | * | 4/2019 | ............. C08L 63/00 |
| CN | 110494493 A | | 11/2019 | |
| JP | 2018087305 A | | 6/2018 | |
| TW | 201640530 A | | 11/2016 | |
| WO | 2018194100 A1 | | 10/2018 | |

OTHER PUBLICATIONS

CN-109553955-A (Apr. 2, 2019) machine translation.*
Magnetic Materials, Zhang Youngang et al., Chengdu Institute of Telecommunications Engineering Press, p. 120.
Principles and Design of Switching Power Supplies, Shen Xianqing et al., Southest University Press., p. 154.
Chinese Office Action, Chinese Patent Application No. 202011165215.0.
International Search Report mailed Jul. 7, 2021; International Patent Application No. PCT/CN2020/127788 filed Nov. 10, 2020.

* cited by examiner

*Primary Examiner* — Ana L. Woodward
(74) *Attorney, Agent, or Firm* — McDonald Hopkins LLC

(57) ABSTRACT

A magnetic dielectric resin composition, and a prepreg and a copper clad laminate comprising same. The magnetic dielectric resin composition comprises a resin and a magnetic filler. The absolute value of the temperature drift coefficient of the magnetic filler under the conditions of −55° C. to 150° C. is 0-1000 ppm/° C. Preparation raw materials of the magnetic filler comprise a combination of iron oxide and a metal oxide. By means of mutual synergy of the resin and the specific magnetic filler, and on the premise of ensuring good dielectric properties, the magnetic dielectric resin composition has a high magnetic permeability, a low magnetic loss, and a proper cut-off frequency, and can also reduce a temperature drift coefficient and improve stability. The copper clad laminate comprising the magnetic dielectric resin composition has a high relative magnetic permeability, a low magnetic loss, a low temperature drift coefficient, and a superior thermal stability, and can fully satisfy application requirements for copper clad laminate in the preparation of high-performance and miniaturized electronic products.

18 Claims, No Drawings

MAGNETIC DIELECTRIC RESIN COMPOSITION, AND PREPREG AND COPPER CLAD LAMINATE COMPRISING SAME

CROSS-REFERENCE TO RELATED APPLICATION

This application is a 35 U.S.C. 371 national stage filing of PCT Application No. PCT/CN2020/127788, filed on Nov. 10, 2020, which claims the benefit of Chinese Patent Application No. 202011165215.0, filed on Oct. 27, 2020, both of which are incorporated herein in their entirety by reference.

TECHNICAL FIELD

The present application belongs to the technical field of copper clad laminates and specifically relates to a magnetodielectric resin composition, a prepreg comprising the same, and a copper clad laminate comprising the same.

BACKGROUND

With the gradual development of microelectronics, micromechanics and other emerging microfabrication technologies, electronic components such as drive capacitors, integrated circuits, circuit modules, and antenna radio frequency modules are constantly oriented toward miniaturization in the context of high-density mounting technology. As a key component in radar and modern wireless communication systems, antenna elements with compact size have important transmission performance, and it is necessary to further reduce the antenna size to realize the overall miniaturization of electronic devices. Therefore, the small antennas has attracted great interest and been developed continually.

Sheets represented by copper clad laminates are important building elements for antennas, and one way to reduce the size of antennas is to use high-dielectric sheets. For example, CN103351578A discloses a resin composition, which is used for forming a dielectric layer of a dielectric substrate of an antenna, and use thereof. The resin composition includes an epoxy resin containing a naphthalene ring or a biphenyl structure, an epoxy resin having a low coefficient of thermal expansion after curing, a viscosity adjuster and a spherical ceramic powder with a presintering treatment; the dielectric substrate obtained from the resin composition has a high dielectric constant, high peel strength, low coefficient of thermal expansion and uniform thickness, which can satisfy the performance requirement for the high-dielectric antenna substrate. CN103101252A discloses a method of preparing a high-dielectric and low-loss CEM-3 copper clad laminate. In the method, a bisphenol A epoxy resin with good dielectric properties is used as a main resin and combined with a high dielectric filler, so that the resin will have a high dielectric constant and low dielectric loss after curing. The high dielectric filler is titanium dioxide, aluminum trioxide, barium titanate or lead titanate, and the obtained CEM-3 copper-clad sheet has good performance. Although the above high-dielectric sheet can reduce the size of the antenna, it will also reduce the gain and overall performance of the antenna.

Another way to reduce the antenna size is to use a material with magnetodielectric properties as a substrate. According to the wavelength formula $\lambda=c/f\cdot(\varepsilon_r\cdot\mu_r)^{1/2}$, wherein $\lambda$ represents the wavelength, c represents the speed of light in vacuum, f represents the frequency, and $(\varepsilon_r\cdot\mu_r)^{1/2}$ represents the miniaturization factor, the larger the permittivity $\varepsilon_r$ and the larger the magnetic permeability $\mu_r$, the higher the miniaturization factor and the more favorable the miniaturization. In a case where the permittivity cannot be changed, the antenna size can be effectively reduced by increasing the magnetic permeability while maintaining or increasing the antenna gain and bandwidth.

CN106797699A discloses a magnetodielectric substrate, a circuit material and a component comprising the same, which comprises a first dielectric layer, a second dielectric layer, and at least one magnetic reinforcement layer provided between the first dielectric layer and the second dielectric layer and in close contact with both; the magnetic reinforcement layer includes a ferrite material. The magnetodielectric substrate has low dielectric constant, low magnetic loss and low power consumption; however, the magnetodielectric sheet has low magnetic permeability, which cannot meet the differentiated needs of electronic products for magnetic substrates, and has inadequate insulation properties, which leads to poor usability of electronic products.

Most of the magnetodielectric materials in the prior art use spinel ferrite or planar hexagonal ferrite; among them, the spinel ferrite, such as Ni—Zn ferrite and Mn—Zn ferrite, has high magnetic permeability but low cut-off frequency, which cannot be applied at 300 MHz or more; the planar hexagonal ferrite, such as $Co_2Z$ hexagonal ferrite, has high cut-off frequency, but its magnetic permeability is low, which makes it difficult to significantly reduce the antenna size. In the future, with the antenna being miniaturized and integrated, electronic products will be further continuously developed into high density and multi-layer direction; additionally, with the development of buried capacitor, buried resistor and buried sensor, the low volume and high power characteristics of electronic components will inevitably lead to heat aggregation, thus increasing the working temperature of the device, and the local temperature may even reach 100° C. or more, which requires antennas and other components to have good thermal stability. However, the magnetodielectric sheets in the prior art cannot realize a balance among dielectric constant, thermal conductivity, stability, magnetic permeability and magnetic loss, which greatly limits the application of magnetodielectric sheets in electronic products.

Therefore, it has been the focus of research in the art to develop a magnetodielectric material with low dielectric constant, high magnetic permeability and good thermal stability to satisfy the high-performance and miniaturization requirements for electronic products.

SUMMARY

To address the shortcomings of the prior art, the present application is to provide a magnetodielectric resin composition, a prepreg comprising the same, and a copper clad laminate comprising the same. Through the synergistic relationship between the resin and the specific magnetic filler, the magnetodielectric resin composition has significantly improved magnetic permeability and dielectric properties, and reduced temperature drift coefficient of magnetic permeability and magnetic loss, which allows the copper clad laminate comprising the same has high magnetic permeability, low magnetic loss and low temperature drift coefficient of magnetic permeability, and has excellent stability and dielectric properties, fully satisfying the high-performance and miniaturization requirements for electronic products.

To achieve the objects, the present application adopts the technical solutions below.

In a first aspect, the present application provides a magnetodielectric resin composition, the magnetodielectric resin composition includes a resin and a magnetic filler; the magnetic filler has an absolute value of temperature drift coefficient of 0-1000 ppm/° C. at −55-150° C., such as 1 ppm/° C., 5 ppm/° C., 10 ppm/° C., 20 ppm/° C., 30 ppm/° C., 50 ppm/° C., 70 ppm/° C., 90 ppm/° C., 100 ppm/° C., 150 ppm/° C., 200 ppm/° C., 250 ppm/° C., 300 ppm/° C., 350 ppm/° C., 400 ppm/° C., 450 ppm/° C., 500 ppm/° C., 550 ppm/° C., 600 ppm/° C., 650 ppm/° C., 700 ppm 1° C., 750 ppm/° C., 800 ppm/° C., 850 ppm/° C., 900 ppm/° C. or 950 ppm/° C., and the specific point values between any two of the above point values are also included, and due to limited space and for brevity, the specific point values included in the range will not be listed exhaustively in the present application.

A raw material for preparing the magnetic filler includes a combination of iron oxide and metal oxide; the metal oxide contains metal which is selected from any one or a combination of at least two of Ba, Sr, Co, Ni, Cu, Zn, Mg, Mn, V, Mo, Cr, Sn, W, Bi, Hf, Nb, Ca, Zr, Al, Ti, Ta or La.

The magnetodielectric resin composition provided by the present application includes a resin and a specific magnetic filler, and the two parties cooperate with each other, giving the magnetodielectric resin composition excellent magnetic permeability and dielectric properties. The magnetic filler has an absolute value of temperature drift coefficient of 0-1000 ppm/° C., and the preparation raw material includes a combination of iron oxide and metal oxide; the magnetic filler with specific components allows the magnetodielectric resin composition to have high permeability, low magnetic loss and suitable cut-off frequency on the one hand, and have reduced temperature drift coefficient and improved stability on the other hand, while ensuring good dielectric properties, so that the copper clad laminate comprising the same can achieve a balance of performance in magnetic permeability, magnetic loss, dielectric properties, stability and cut-off frequency, and is suitable for the preparation of high-performance and miniaturized electronic products.

The temperature drift coefficient in the present application is $(\varepsilon_r \cdot \mu_r)^{1/2}$ temperature drift coefficient, wherein $\varepsilon_r$ represents the relative permittivity and $\mu_r$ represents the relative magnetic permeability; the temperature drift coefficient represents the relative rate of change of magnetic permeability at −55-150° C. By using the air-line test method (the testing instruments are E5071C, N1500, 8050D or other systems from Keysight), the magnetic properties and dielectric properties of the material are measured at 0.1-18 GHz, performance tests at different temperature are performed in a temperature-controlled box. The same term hereinafter has the same meaning.

The magnetic filler has an absolute value of temperature drift coefficient of 0-1000 ppm/° C. at −55-150° C. The magnetic filler includes a magnetic filler with positive temperature drift coefficient and/or a magnetic filler with negative temperature drift coefficient. There is no limitation on the type and content of the magnetic filler with positive temperature drift coefficient and the magnetic filler with negative temperature drift coefficient, but it is required that the absolute value of temperature drift coefficient is 0-1000 ppm/° C. in the present application. Similarly, the magnetic filler can be one or a combination of at least two of magnetic fillers, but it is required that the absolute value of temperature drift coefficient is ppm/° C. in the present application.

In the present application, the magnetic filler has an absolute value of temperature drift coefficient of less than or equal to 1000 ppm/° C., which gives the magnetodielectric resin composition desirable magnetodielectric properties. If the absolute value of the intrinsic temperature drift coefficient of the magnetic filler is greater than 1000 ppm/° C., the temperature drift coefficient of the prepared magnetodielectric resin composition will be greater than 400 ppm/° C., resulting in a large change in magnetic permeability, and the magnetodielectric resin composition cannot satisfy the application requirements.

Preferably, the magnetic filler has an absolute value of temperature drift coefficient of 5-500 ppm/° C. at −55-150° C.

As a preferred technical solution of the present application, the magnetic filler has an absolute value of temperature drift coefficient of 5-500 ppm/° C. at −55-150° C. The temperature drift coefficient is further optimized so that the temperature drift coefficient of the sheet can be smaller and the device has better environmental resistance.

Preferably, the magnetic filler has an absolute value of temperature drift coefficient of 5-500 ppm/° C. at 0.1-18 GHz, such as 5 ppm/° C., 10 ppm/° C., 20 ppm/° C., 30 ppm/° C., 50 ppm/° C., 70 ppm/° C., 90 ppm/° C., 100 ppm/° C., 150 ppm/° C., 200 ppm/° C. 250 ppm/° C., 300 ppm/° C., 350 ppm/° C., 400 ppm/° C., 450 ppm/° C., or 480 ppm/° C., and the specific point values between any two of the above point values are also included, and due to limited space and for brevity, the specific point values included in the range will not be listed exhaustively in the present application.

Preferably, the magnetic filler has a magnetic permeability of 5-1000, such as 10, 15, 20, 30, 50, 100, 150, 200, 250, 300, 350, 400, 450, 500, 550, 600, 650, 700, 750, 800, 850, 900 or 950, and the specific point values between any two of the above point values are also included, and due to limited space and for brevity, the specific point values included in the range will not be listed exhaustively in the present application.

As a preferred technical solution of the present application, the magnetic permeability (relative magnetic permeability) of the magnetic filler is 5-1000, giving the magnetodielectric resin composition a high magnetic permeability and a suitable cut-off frequency. When the magnetic permeability of the magnetic filler is less than 5, the magnetic permeability of the magnetodielectric resin composition will be less than 1.5, which cannot satisfy the application requirements. When the magnetic permeability of the magnetic filler is greater than 1000, the corresponding cut-off frequency will be less than 200 MHz, which cannot satisfy the application requirements.

Preferably, the magnetic filler has a particle size of 0.1-30 μm (the particle size of the filler referred to herein is measured by using particle size distribution of laser diffraction scattering method), such as 0.5 μm, 1 μm, 1.5 μm, 2 μm, 3 μm, 4 μm, 5 μm, 6 μm, 7 μm, 8 μm, 9 μm, 10 μm, 11 μm, 13 μm, 15 μm, 17 μm 19 μm, 20 μm, 21 μm, 23 μm, 25 μm, 27 μm or 29 μm, and the specific point values between any two of the above point values are also included, and due to limited space and for brevity, the specific point values included in the range will not be listed exhaustively in the present application.

As a preferred technical solution of the present application, the magnetic filler has a particle size of 0.1-30 μm, which can be well dispersed in the resin system to obtain a magnetodielectric resin composition with uniform and stable properties. If the particle size of the magnetic filler exceeds the above range, its dispersibility will be reduced, affecting the performance stability and uniformity of the magnetodielectric resin composition and the copper clad laminate comprising the same.

In the present application, the raw material for preparing the magnetic filler contains iron oxide with a molar percentage of 40-72%, such as 42%, 45%, 48%, 50%, 52%, 55%, 58%, 60%, 62%, 65%, 68% or 70%, and the specific point values between any two of the above point values are also included, and due to limited space and for brevity, the specific point values included in the range will not be listed exhaustively in the present application.

Preferably, the metal oxide contains metal which is selected from any one or a combination of at least two of Ba, Co, Ni, Cu, Zn, Mg, Mn, V or Bi.

In order to improve the temperature drift coefficient of ferrite magnetic materials, it is usually necessary to adjust the magnetocrystalline anisotropy constant K1 and the magnetostriction coefficient λs. Ferrite has a large λs, and the doping metal ions such as Co and Zn can significantly improve the K1 and λs of the material, thus improving the temperature coefficient.

In the present application, a method of preparing the magnetic filler includes: mixing and sintering iron oxide, metal oxide and an optional auxiliary material, and crushing the sintering product to obtain the magnetic filler.

In the present application, the magnetic filler is obtained by mixing and sintering iron oxide, metal oxide and an optional auxiliary material. High temperature sintering is a chemical process that allows different metal oxides to react with each other and thus form a specific structure, improving the performance of the magnetic material. Physical mixing is a physical process, where iron oxide is just mixed with other metal oxides and cannot form a new structure, and thus the performance improvement is not obvious.

Preferably, a method of the mixing includes physical dry mixing.

Preferably, the sintering has a temperature of 800-2000° C., such as 850° C., 900° C., 950° C., 1000° C., 1050° C., 1100° C., 1150° C., 1200° C., 1250° C., 1300° C., 1350° C., 1400° C., 1450° C., 1500° C., 1600° C., 1700° C., 1800° C., 1900° C. or 1950° C., and the specific point values between any two of the above point values are also included, and due to limited space and for brevity, the specific point values included in the range will not be listed exhaustively in the present application.

Preferably, the sintering has a time of 1-8 h, such as 1.5 h, 2 h, 2.5 h, 3 h, 3.5 h, 4 h, 4.5 h, 5 h, h, 6 h, 6.5 h, 7 h or 7.5 h, and the specific point values between any two of the above point values are also included, and due to limited space and for brevity, the specific point values included in the range will not be listed exhaustively in the present application.

Preferably, a method of the crushing includes wet ball milling crushing.

In the present application, a mass of the magnetic filler is 20-90% of a total mass of the magnetic filler and an organic matter, such as 22%, 25%, 28%, 30%, 32%, 35%, 38%, 40%, 42%, 45%, 48%, 50%, 52%, 55%, 58%, 60%, 62%, 65%, 68%, 70%, 72%, 75%, 78%, 80%, 82%, 85%, or 88%, and the specific point values between any two of the above point values are also included, and due to limited space and for brevity, the specific point values included in the range will not be listed exhaustively in the present application.

The term "organic matter" includes a resin, and optionally a combination of a curing agent, a crosslinker, an initiator and a curing accelerator. Namely, when the magnetodielectric resin composition includes no non-magnetic filler, a mass percentage of the magnetic filler is 20-90% in the magnetodielectric resin composition; when the magnetodielectric resin composition also includes a non-magnetic filler, a mass percentage of the magnetic filler is 20-90% in the magnetodielectric resin composition components other than the non-magnetic filler.

As a preferred technical solution of the present application, a mass of the magnetic filler is of a total mass of the magnetic filler and the organic matter; if the content of magnetic filler is too high, the dispersibility of magnetic filler in the resin system will be poor, and the magnetodielectric resin composition with uniform properties cannot be obtained, and thus the prepreg and copper clad laminate cannot be obtained; if the content of magnetic filler is too low, the magnetic permeability of the magnetodielectric resin composition and the copper clad laminate comprising the same will be reduced, and the desired magnetodielectric properties will not be obtained.

In the present application, the resin comprises any one or a combination of at least two of an epoxy resin, a cyanate resin, a polyphenylene ether resin, a polybutadiene resin, a styrene butadiene resin, a maleimide-triazine resin, a maleimide resin, a polytetrafluoroethylene resin, a polyimide resin, a phenolic resin, an acrylic resin, a liquid crystal resin, a benzoxazine resin, a phenoxy resin or a nitrile butadiene rubber.

Preferably, the nitrile butadiene rubber includes a carboxyl-terminated nitrile butadiene rubber and/or a hydroxyl-terminated nitrile butadiene rubber.

In the present application, the magnetodielectric resin composition further includes an initiator.

Preferably, the initiator includes any one or a combination of at least two of an organic peroxide initiator, an amine initiator, an imidazole initiator, a phenolic initiator, a boron trifluoride complex initiator, triphenyl phosphate or triphenyl phosphite.

Preferably, the organic peroxide initiator includes any one or a combination of at least two of α,α'-di-tert-butylperoxy-m-isopropylbenzene-benzene, diisopropylbenzene peroxide, tert-butylperoxy-isopropylbenzene, 1,1-bis-tert-hexylperoxy-3,3,5-trimethylcyclohexane, 2,5-dimethyl-2,5-bis-tert-butylperoxy-3-hexyne, tert-butyl octaneperoxoate or tert-butyl peroxybenzoate.

Preferably, the amine initiator includes a tertiary amine initiator and/or a quaternary ammonium salt initiator.

Preferably, the tertiary amine initiator includes benzyldimethylamine and/or 2,4,6-tris (dimethylaminomethyl)phenol.

Preferably, the magnetodielectric resin composition further includes a curing accelerator.

Preferably, the curing accelerator includes any one or a combination of at least two of an imidazole compound, a piperidine compound, a pyridine compound or organometallic Lewis acid.

Preferably, the imidazole compound includes any one or a combination of at least two of 2-methylimidazole, 2-ethyl-4-methylimidazole, 2-phenylimidazole, 2-undecylimidazole, 1-benzyl-2-methylimidazole, 2-heptadecylimidazole, 2-isopropylimidazole, 2-phenyl-4-methylimidazole, 2-dodecylimidazole or 1-cyanoethyl-2-methylimidazole.

Preferably, the magnetodielectric resin composition further includes a crosslinker.

Preferably, the crosslinker includes any one or a combination of at least two of triallyl isocyanurate, poly(triallyl isocyanurate), triallyl cyanurate, trimethyl acrylic acid, diallyl phthalate, divinylbenzene or polyfunctional acrylate.

Preferably, the magnetodielectric resin composition further includes a non-magnetic filler.

Preferably, the non-magnetic filler includes any one or a combination of at least two of silicon dioxide, titanium dioxide, barium titanate, strontium titanate, magnesium titanate, calcium titanate, barium strontium titanate, barium calcium titanate, lead titanate, lead zirconate titanate, lead lanthanum zirconate titanate, barium lanthanum titanate, barium zirconate titanate, hafnium dioxide, lead magnesium niobate, barium magnesium niobate, lithium niobate, potassium niobate, strontium aluminum tantalate, potassium tantalate niobate, barium strontium niobate, barium lead niobate, barium titanium niobate, strontium bismuth tantalate, bismuth titanate, barium rubidium titanate, copper titanate, or lead magnesium niobate-lead titanate.

Preferably, the magnetodielectric resin composition further includes a flame retardant.

In another aspect, the present application provides a resin glue liquid, and the resin glue liquid is obtained by dissolving or dispersing the magnetodielectric resin composition in a solvent.

Preferably, the solvent includes any one or a combination of at least two of an alcohol solvent, an ether solvent, an aromatic hydrocarbon solvent, an ester solvent, a ketone solvent or a nitrogen-containing solvent.

Preferably, the alcohol solvent includes any one or a combination of at least two of methanol, ethanol or butanol.

Preferably, the ether solvent includes any one or a combination of at least two of ethyl cellosolve, butyl cellosolve, 2-methoxyethanol, di(ethylene glycol) ethyl ether or di(ethylene glycol) butyl ether.

Preferably, the aromatic hydrocarbon solvent includes any one or a combination of at least two of benzene, toluene, xylene or 1,3,5-trimethylbenzene.

Preferably, the ester solvent includes any one or a combination of at least two of ethyl acetate, butyl acetate or ethoxyethyl acetate.

Preferably, the ketone solvent includes any one or a combination of at least two of acetone, butanone, methyl ethyl ketone, methyl isobutyl ketone or cyclohexanone.

Preferably, the nitrogen-containing solvent includes any one or a combination of at least two of N,N-dimethylformamide, N,N-dimethylacetamide or N-methyl-2-pyrrolidone.

Preferably, the resin glue liquid has a solid content of 20-90%, such as 22%, 25%, 28%, 30%, 32%, 35%, 38%, 40%, 42%, 45%, 48%, 50%, 52%, 55%, 58%, 60%, 62%, 65%, 68%, 70%, 72%, 75%, 78%, 80%, 82%, 85% or 88%, and the specific point values between any two of the above point values are also included, and due to limited space and for brevity, the specific point values included in the range will not be listed exhaustively in the present application.

In another aspect, the present application provides a resin coated copper foil or a resin film, which is prepared with the magnetodielectric resin composition.

The resin coated copper foil is obtained by applying the magnetodielectric resin composition in solution form to a surface of the conductive metal layer with a coating weight of 2-15 g/m 2.

The resin film is obtained by coating the magnetodielectric resin composition on a release material and removing the release material after drying, and semi-curing or curing to obtain the resin film.

In another aspect, the present application provides a prepreg, and the prepreg includes a reinforcing material, and the magnetodielectric resin composition which is adhered to the reinforcing material after impregnating and drying Preferably, the reinforcing material includes an inorganic reinforcing material and/or an organic reinforcing material.

Preferably, the reinforcing material includes any one or a combination of at least two of fiberglass cloth, non-woven fabric, quartz cloth or paper.

Preferably, the fiberglass cloth can be E-fiberglass cloth, D-fiberglass cloth, S-fiberglass cloth, T-fiberglass cloth, NE-fiberglass cloth, Q-fiberglass cloth, L-fiberglass cloth or QL-fiberglass cloth, etc.

Exemplarily, a method of preparing the prepreg includes: impregnating the reinforcing material with the resin liquid of the magnetodielectric resin composition, removing the reinforcing material out and then drying it to obtain the prepreg.

Preferably, the drying has a temperature of 100-250° C., such as 105° C., 110° C., 115° C., 120° C., 130° C., 140° C., 150° C., 160° C., 170° C., 180° C., 190° C., 200° C., 210° C., 220° C., 230° C., 240° C. or 245° C., etc.

Preferably, the drying has a time of 1-15 min, such as 2 min, 3 min, 4 min, 5 min, 6 min, 7 min, 8 min, 9 min, 10 min, 11 min, 12 min, 13 minor 14 min, etc.

In another aspect, the present application provides a laminate, and the laminate includes at least one prepreg as described above.

In another aspect, the present application provides a copper clad laminate, and the copper clad laminate includes at least one prepreg as described above, and a copper foil provided on one or two sides of the prepreg.

Exemplarily, a method of preparing the copper clad laminate includes: laminating a copper foil on one or two sides of a prepreg, and curing to obtaining the copper clad laminate; or, bonding at least two prepregs to form a laminate, and then laminating a copper foil on one or two sides of the laminate, and curing to obtain the copper clad laminate.

Preferably, the curing is carried out in a hot press.

Preferably, the curing has a temperature of 150-250° C., such as 150° C., 155° C., 160° C., 165° C., 170° C., 175° C., 180° C., 185° C., 190° C., 195° C., 200° C., 205° C., 210° C., 215° C., 220° C., 225° C., 230° C., 235° C., 240° C. or 245° C., etc.

In another aspect, the present application provides a printed wiring board, and the printed wiring board includes at least one prepreg as described above or one copper clad laminate as described above.

Compared with the prior art, the present application has the following beneficial effects.

The magnetodielectric resin composition provided by the present application has good magnetic properties and dielectric properties by combining the resin and magnetic filler. The absolute value of the temperature drift coefficient of magnetic permeability of the magnetic filler is 0-1000 ppm/° C. The preparation raw material includes a combination of iron oxide and metal oxide. The magnetic filler with specific components allows the magnetodielectric resin composition to have high permeability, low magnetic loss and suitable cut-off frequency on the one hand, and have reduced temperature drift coefficient and improved stability on the other hand, while ensuring good dielectric properties. The copper clad laminate comprising the magnetodielectric resin composition has high relative magnetic permeability as high as 6-10, and low magnetic loss, and the magnetic loss tangent value is 0.01-0.045, and an absolute value of temperature drift coefficient is 30-100 ppm/° C. The copper clad laminate has high magnetic permeability, low magnetic loss, low temperature drift coefficient and high performance stability, which can fully satisfy the application requirements for copper clad laminates in the preparation of high-performance and miniaturized electronic products.

DETAILED DESCRIPTION

The technical solutions of the present application are further described below through embodiments. It should be apparent to those skilled in the art that the embodiments are only used for a better understanding of the present application and should not be regard as a specific limitation of the present application.

Preparation Example

The components and properties of magnetic fillers used in examples and comparative examples below in the present application are shown in Table 1; in Table 1, the content of each component is a molar percentage.

TABLE 1

| Model | Iron Oxide | Zinc Oxide | Cobalt Oxide | Barium Oxide | Bismuth Monoxide | Manganese Oxide | Magnetic Permeability | Average Particle Size | Temperature drift Coefficient (−55-150 ° C.) |
|---|---|---|---|---|---|---|---|---|---|
| DZC-80 | 40 | 52 | 3 | 5 | 0 | 0 | 80 | 10 μm | 80 ppm/° C. |
| DZC-100 | 55 | 40 | 5 | 0 | 0 | 0 | 100 | 10 μm | 130 ppm/° C. |
| DFC-230 | 72 | 20 | 7 | 0 | 1 | 0 | 230 | 30 μm | −200 ppm/° C. |
| DFC-500 | 80 | 10 | 0 | 0 | 0 | 10 | 500 | 10 μm | −1400 ppm/° C. |
| DZC-430 | 70 | 0 | 20 | 5 | 2 | 3 | 430 | 10 μm | 1250 ppm/° C. |

A method of preparing the magnetic filler is as follows.

According to the formula shown in Table 1, various raw material components were weighed according to the molar proportion, subjected to physical dry mixing for 1 h, prepared into a ring-shaped body, and then sintered at 1300° C. for 4 h; the sintering product obtained was a ring-shaped sample (inner diameter: 3.04 mm, outer diameter: 6.96 mm, thickness: 3 mm); the sintering product was subjected to wet ball milling in a ball mill at 3000 rpm for 1-5 h, and zirconium beads with a particle size of 1-10 mm were used for combination; the product was dried after ball milling to obtain the magnetic filler; the magnetic fillers with different particle sizes were prepared by controlling the ball milling time.

In Table 1, the magnetic permeability and temperature drift coefficient were measured by methods below.

(1) Sample preparation: various raw material components were subjected to physical dry mixing, then prepared into a ring-shaped body, and sintered at 1300° C. for 4 h; the sintering product obtained was a ring-shaped sample (inner diameter: 3.04 mm, outer diameter: 6.96 mm, thickness: 3 mm); the magnetic permeability and temperature drift coefficient of the sintering product were measured.

(2) Magnetic permeability measurement: the magnetic permeability of the material was measured at 200 MHz by an impedance analyzer; the instrument was Keysight E5071C network analyzer+N1500 measurement system; the instrument measure range from 0.1 to 18 GHz.

(3) Temperature drift coefficient measurement: the above measurement system was placed into a high and low temperature oven; the magnetic permeability was measured at −55° C., 25° C. and 150° C. respectively, and the temperature drift coefficient was calculated according to the equation below.

$$\text{Temperature drift coefficient}=1000000\times(\text{magnetic permeability}_{150^\circ\,C.}-\text{magnetic permeability}_{-55^\circ\,C.})/(200\times\text{magnetic permeability}_{25^\circ\,C.})$$

Experimental materials used in the examples of the present application include:

(1) resin: epoxy resin: Bisphenol A type Novolac epoxy resin (EPR627, Momentive Chemicals, USA); Brominated epoxy resin: BEB531A80P, Changchun, Taiwan; Phenoxy resin: YP-50EK35, Nippon Steel; Polyphenylene ether resin: SA9000, Sabic;

(2) curing accelerator: an imidazole curing accelerator, 2-MI, BASF, Germany;

(3) curing agent: 4,4'-diaminodiphenyl sulfone (DDS);

(4) crosslinker: TAIC crosslinker, purchased from Liuyang Organic Chemical Co., Ltd.;

(5) initiator: diisopropylbenzene peroxide (DCP), Shanghai Gaoqiao Petrochemical Company;

(6) reinforcing material: fiberglass cloth, China Jushi Co., Ltd.

Example 1

A magnetodielectric resin composition includes, by part by weight, the following components: parts by weight of brominated epoxy resin, 15 parts by weight of phenoxy resin, 35 parts by weight of polyphenylene ether resin, 20 parts by weight of magnetic filler DZC-100, 4.9 parts by weight of TAIC, 4.5 parts by weight of DDS, 0.5 parts by weight of 2-MI, and 0.1 parts by weight of DCP.

The magnetodielectric resin composition was used to prepare a copper clad laminate by the following method:

(1) the magnetodielectric resin composition was mixed with ethylene glycol methyl ether and dispersed uniformly at room temperature to obtain a resin liquid with a solid content of 80%; and (2) the reinforcing material (fiberglass cloth) was impregnated with the resin liquid obtained from step (1), placed in an oven and baked at 155° C. for 5 min for curing to obtain a prepreg; the prepreg was placed between two copper foils, laminated in a hot press at 210° C. and 5 MPa and cured for 2 h to obtain the copper clad laminate.

Example 2

A magnetodielectric resin composition includes, by part by weight, the following components: 2.97 parts by weight of epoxy resin, 4.5 parts by weight of brominated epoxy resin, 2 parts by weight of phenoxy resin, 90 parts by weight of magnetic filler DZC-80, 0.5 parts by weight of DDS, and 0.03 parts by weight of 2-MI.

The magnetodielectric resin composition was used to prepare a copper clad laminate by the same method as in Example 1, and the copper clad laminate was obtained.

Example 3

A magnetodielectric resin composition includes, by part by weight, the following components: 16 parts by weight of epoxy resin, 20.35 parts by weight of brominated epoxy resin, 5 parts by weight of phenoxy resin, 50 parts by weight of magnetic filler DFC-230, 8 parts by weight of DDS, and 0.65 parts by weight of 2-MI.

The magnetodielectric resin composition was used to prepare a copper clad laminate by the same method as in Example 1, and the copper clad laminate was obtained.

Example 4

A magnetodielectric resin composition includes, by part by weight, the following components: parts by weight of epoxy resin, 8.5 parts by weight of brominated epoxy resin, 5 parts by weight of phenoxy resin, 70 parts by weight of magnetic filler DZC-80, 10 parts by weight of silica powder, 0.5 parts by weight of DDS, and 0.03 parts by weight of 2-MI.

The magnetodielectric resin composition was used to prepare a copper clad laminate by the same method as in Example 1, and the copper clad laminate was obtained.

Example 5

A magnetodielectric resin composition includes, by part by weight, the following components: 16 parts by weight of epoxy resin, 20.35 parts by weight of brominated epoxy resin, 5 parts by weight of phenoxy resin, 25 parts by weight of magnetic filler DZC-100, 25 parts by weight of magnetic filler DFC-230, 8 parts by weight of DDS, and 0.65 parts by weight of 2-MI.

The magnetodielectric resin composition was used to prepare a copper clad laminate by the same method as in Example 1, and the copper clad laminate was obtained.

Comparative Example 1

A magnetodielectric resin composition is provided, whose components differ from those of Example 3 only in that the magnetic filler DFC-230 was replaced with magnetic filler DFC-500 in equal mass.

The magnetodielectric resin composition was used to prepare a copper clad laminate by the same method as in Example 1, and the copper clad laminate was obtained.

Comparative Example 2

A magnetodielectric resin composition includes, by part by weight, the following components: 7 parts by weight of epoxy resin A, 26.5 parts by weight of brominated epoxy resin, 15 parts by weight of phenoxy resin, 38.5 parts by weight of polyphenylene ether resin, 3 parts by weight of magnetic filler DZC-100, 4.9 parts by weight of TAIC, 4.5 parts by weight of DDS, 0.5 parts by weight of 2-MI, and 0.1 parts by weight of DCP.

The magnetodielectric resin composition was used to prepare a copper clad laminate by the same method as in Example 1, and the copper clad laminate was obtained.

Comparative Example 3

A magnetodielectric resin composition is provided, whose components differ from those of Example 1 only in that the magnetic filler DZC-100 was replaced with magnetic filler DZC-430 in equal mass.

The magnetodielectric resin composition was used to prepare a copper clad laminate by the same method as in Example 1, and the copper clad laminate was obtained.

Performance Test (1) Sample preparation: the laminates were processed into ring-shaped samples (inner diameter: 3.04 mm, outer diameter: 6.96 mm, thickness: 3 mm).

(2) Relative magnetic permeability and magnetic loss tangent: the magnetic permeability of the material was measured at 200 MHz by an impedance analyzer; the instrument was Keysight E5071C network analyzer+N1500 measurement system; the instrument measure range from 0.1 to 18 GHz.

(3) Temperature drift coefficient: the above measurement system was placed into a high and low temperature oven; the magnetic permeability was measured at −55° C., 25° C. and 150° C. respectively, and the temperature drift coefficient was calculated according to the equation below.

$$\text{Temperature drift coefficient}=1000000\times(\text{magnetic permeability}_{150^\circ\,C.}-\text{magnetic permeability}_{-55^\circ\,C.})/(200\times\text{magnetic permeability}_{25^\circ\,C.})$$

The various properties of the copper clad laminates obtained from Examples 1-5 and Comparative Examples 1-3 were tested in accordance with the above performance test methods, and the components of the magnetodielectric resin compositions and the performance test results of the copper clad laminates comprising the same are summarized as shown in Table 2.

TABLE 2

| Item | | Example 1 | Example 2 | Example 3 | Example 4 | Example 5 | Comparative Example 1 | Comparative Example 2 | Comparative Example 3 |
|---|---|---|---|---|---|---|---|---|---|
| Epoxy resin | Epoxy resin A | 0 | 2.97 | 16 | 5.97 | 16 | 16 | 7 | 0 |
| | Brominated epoxy resin B | 20 | 4.5 | 20.35 | 8.5 | 20.35 | 20.35 | 26.5 | 20 |
| | Phenoxy resin C | 15 | 2 | 5 | 5 | 5 | 5 | 15 | 15 |
| Polyphenylene ether resin | SA9000 | 35 | 0 | 0 | 0 | 0 | 0 | 38.5 | 35 |

TABLE 2-continued

| Item | | Example 1 | Example 2 | Example 3 | Example 4 | Example 5 | Comparative Example 1 | Comparative Example 2 | Comparative Example 3 |
|---|---|---|---|---|---|---|---|---|---|
| Crosslinker | DDS | 4.5 | 0.5 | 8 | 0.5 | 8 | 8 | 4.5 | 4.5 |
| | TAIC | 4.9 | 0 | 0 | 0 | 0 | 0 | 4.9 | 4.9 |
| Initiator | 2-MI | 0.5 | 0.03 | 0.65 | 0.03 | 0.65 | 0.65 | 0.5 | 0.5 |
| | DCP | 0.1 | 0 | 0 | 0 | 0 | 0 | 0.1 | 0.1 |
| Magnetic filler1 | Type | DZC-100 | DZC-80 | DFC-230 | DZC-80 | DZC-100 | DFC-500 | DZC-100 | DZC-430 |
| | Magnetic permeability | 100 | 80 | 230 | 80 | 100 | 500 | 100 | 430 |
| | Temperature drift coefficient (ppm/° C. | 130 | 80 | −200 | 80 | 130 | −1400 | 130 | 1250 |
| | Particle size (μm) | 10 | 10 | 30 | 10 | 10 | 10 | 10 | 10 |
| | Addition amount | 20 | 90 | 50 | 70 | 25 | 50 | 3 | 20 |
| Magnetic filler2 | Type | | | | | DFC-230 | | | |
| | Magnetic permeability | | | | | 230 | | | |
| | Temperature drift coefficient (ppm/° C. | | | | | −200 | | | |
| | Particle size (μm) | | | | | 30 | | | |
| | Addition amount/g | | | | | 25 | | | |
| Relative magnetic permeability | | 6.1 | 7.8 | 10.0 | 7.0 | 6.5 | 22.3 | 2.2 | 9.2 |
| Magnetic loss tangent | | 0.0200 | 0.0420 | 0.0400 | 0.0382 | 0.0010 | 0.2500 | 0.0030 | 0.0860 |
| Temperature drift coefficient | | 46.0 | 92.0 | −80.0 | 82.2 | 38.0 | −850.0 | 23.9 | 248.5 |

It can be seen from the data in Table 2 that the copper clad laminates, which are prepared from the magnetodielectric resin compositions provided in Examples 1-5 of the present application, have high permeability, low magnetic loss, low temperature drift coefficient and high performance stability, the relative magnetic permeability is as high as 6-10, the magnetic loss tangent is as low as 0.01-0.045, and the absolute value of temperature drift coefficient is 30-100 ppm/° C., which can satisfy the application requirements for copper clad laminates in the preparation of high-performance and miniaturized electronic products.

In the magnetodielectric resin composition, the absolute value of temperature drift coefficient of the magnetic filler is 0-1000 ppm/° C. The obtained magnetodielectric resin composition and the copper clad laminate comprising the same have excellent magnetodielectric properties; if the absolute value of the temperature drift coefficient of the magnetic filler is greater than 1000 ppm/° C. (Comparative Example 1, Comparative Example 3), the properties of the copper clad laminate will be reduced.

In the magnetodielectric resin composition, the mass of magnetic filler is 20-90% of the total mass of an organic matter and the magnetic filler. The two parties cooperate with each other. On the one hand, the magnetic filler is evenly dispersed in the organic system, and on the other hand, the composition is given excellent magnetic properties and dielectric properties. The magnetic filler has a particle size of 0.1-30 μm, which can obtain better dispersibility. If the content of magnetic filler is too low (Comparative Example 2), the magnetic permeability of the copper clad laminate will be reduced and the desired magnetodielectric properties cannot be achieved.

The applicant has stated that a magnetodielectric resin composition, a prepreg comprising the same, and a copper clad laminate comprising the same of the present application are illustrated through embodiments in the present application, but the present application is not limited to the embodiments, which means that the present application is not necessarily rely on the embodiments to be implemented. It should be apparent to those skilled in the art that any improvement to the present application, equivalent substitution of each raw material of the product and addition of auxiliary components in the present application, the choice of specific methods, etc., all fall within the protection scope and disclosure scope of the present application.

What is claimed is:

1. A magnetodielectric resin composition, which comprises an organic matter comprising a resin and a magnetic filler; the magnetic filler has an absolute value of temperature drift coefficient of 0-1000 ppm/° C. at-55-150° C. ; wherein a mass of the magnetic filler is 20-90% of a total mass of the magnetic filler and the organic matter;

a raw material for preparing the magnetic filler comprises a combination of iron oxide and metal oxide; the metal oxide contains metal which is selected from any one of or a combination of Co and Zn; and wherein the raw material for preparing the magnetic filler contains iron oxide with a molar percentage of 40-72%.

2. The magnetodielectric resin composition according to claim 1, wherein the magnetic filler has an absolute value of temperature drift coefficient of 5-500 ppm/° C. at-55-150° C.

3. The magnetodielectric resin composition according to claim 1, wherein the magnetic filler has an absolute value of temperature drift coefficient of 5-500 ppm/°° C. at 0.1-18 GHz.

4. The magnetodielectric resin composition according to claim 1, wherein the magnetic filler has a magnetic permeability of 5-1000, and the magnetic filler has a particle size of 0.1-30 μm.

5. The magnetodielectric resin composition according to claim 1, wherein a method of preparing the magnetic filler comprises: mixing iron oxide, metal oxide and an optional auxiliary material, sintering, and crushing the sintering product to obtain the magnetic filler.

6. The magnetodielectric resin composition according to claim 5, wherein the sintering has a temperature of 800-2000° C., and the sintering has a time of 1-8 h.

7. The magnetodielectric resin composition according to claim 1, wherein the resin comprises any one of or a combination of an epoxy resin and a phenoxy resin.

8. The magnetodielectric resin composition according to claim 1, wherein the magnetodielectric resin composition further comprises an initiator.

9. The magnetodielectric resin composition according to claim 8, wherein the initiator comprises any one or a combination of at least two of an organic peroxide initiator, an amine initiator, an imidazole initiator, a phenolic initiator, a boron trifluoride complex initiator, triphenyl phosphate or triphenyl phosphite.

10. The magnetodielectric resin composition according to claim 1, wherein the magnetodielectric resin composition further comprises a curing accelerator.

11. The magnetodielectric resin composition according to claim 10, wherein the curing accelerator comprises any one or a combination of at least two of an imidazole compound, a piperidine compound, a pyridine compound or organometallic Lewis acid.

12. The magnetodielectric resin composition according to claim 1, the magnetodielectric resin composition further comprises a crosslinker.

13. The magnetodielectric resin composition according to claim 12, wherein the crosslinker comprises any one or a combination of at least two of triallyl isocyanurate, poly (triallyl isocyanurate), triallyl cyanurate, trimethyl acrylic acid, diallyl phthalate, divinylbenzene or polyfunctional acrylate.

14. The magnetodielectric resin composition according to claim 1, the magnetodielectric resin composition further comprises a non-magnetic filler.

15. The magnetodielectric resin composition according to claim 14, wherein the non-magnetic filler comprises any one or a combination of at least two of silicon dioxide, titanium dioxide, barium titanate, strontium titanate, magnesium titanate, calcium titanate, barium strontium titanate, barium calcium titanate, lead titanate, lead zirconate titanate, lead lanthanum zirconate titanate, barium lanthanum titanate, barium zirconate titanate, hafnium dioxide, lead magnesium niobate, barium magnesium niobate, lithium niobate, potassium niobate, strontium aluminum tantalate, potassium tantalate niobate, barium strontium niobate, barium lead niobate, barium titanium niobate, strontium bismuth tantalate, bismuth titanate, barium rubidium titanate, copper titanate, or lead magnesium niobate-lead titanate.

16. The magnetodielectric resin composition according to claim 1, the magnetodielectric resin composition further comprises a flame retardant.

17. A resin coated copper foil or a resin film, which is prepared with the magnetodielectric resin composition according to claim 1.

18. A copper clad laminate, comprising at least one prepreg, and a copper foil provided on one or two sides of the prepreg;

wherein the prepreg comprises a reinforcing material, and the magnetodielectric resin composition according to claim 1 which is adhered to the reinforcing material after impregnating and drying.

* * * * *